June 27, 1967 E. S. LEE III 3,328,769

INFORMATION SORTING DEVICE

Filed April 21, 1964 7 Sheets-Sheet 1

INFORMATION SORTING DEVICE

Filed April 21, 1964 7 Sheets-Sheet 2

INVENTOR.
EDWIN S. LEE, III
BY
Christie, Parker & Hale
ATTORNEYS.

| WRITE CONTROL FOR MARK CELL -200 | |
|---|---|
| CONDITIONS | CONTENT OF MARK CELL |
| $V_{CL}$ = -6v | 1 |
| Vm = 0V RW* = +2v | 0 |

* VRW = -2V WHEN CORRESPONDING WORD MATCHES

FIG. 2A

| CIRCUIT FORMING CONTROL SIGNAL | SIGNAL AT R, W | ACTION IN CELLS 100 & 200 |
|---|---|---|
| NONE | 0 | NO ACTION |
| WRITE DRIVER -10 | - 2v | WRITE COMPLIMENT OF CORRESPONDING COMPARE CELL |
| READ AMPLIFIER -12 | + 2v | READ OUT |

FIG. 2B

| R1 | $\overline{R1}$ | BIT READ OUT OF CORRESPONDING COLUMN |
|---|---|---|
| 0 | -V | ALL 0 BITS |
| -V | 0 | BITS OR COMBINATION OF 1,0 BITS |

FIG. 2C

INVENTOR.
EDWIN S. LEE, III
BY
Christie, Parker & Hale
ATTORNEYS.

| STORAGE CONTENT OF C1 | CONTROL SIGNAL ON LINES | | | | |
|---|---|---|---|---|---|
| | $\overline{C1}_A$ | $C1_A$ | $V_A$ | $C1_B$ | $V_B$ |
| 0 | YES | NO | -2v. | YES | -6v. |
| 1 | NO | YES | -6v. | NO | -2v. |
| ∅ | YES | NO | -2v. | NO | -2v. |

INVENTOR.
EDWIN S. LEE, III
BY
Christie, Parker & Hale
ATTORNEYS.

M GATE TRUTH TABLE

| MD3 | MD2 | MD1 | OUTPUT CIRCUIT RECEIVING SIGNAL |
|---|---|---|---|
| 0 | 0 | 0 | M=0 |
| 0 | 0 | 1 | M=1 |
| 0 | 1 | 0 | M=1 |
| 0 | 1 | 1 | M>1 |
| 1 | 0 | 0 | M=1 |
| 1 | 0 | 1 | M>1 |
| 1 | 1 | 0 | M>1 |
| 1 | 1 | 1 | M>1 |

FLOW SORT CHART

INVENTOR.
EDWIN S. LEE, III
BY
Christie, Parker & Hale
ATTORNEYS.

| SEQUENCE STEP | PHASE SORT TIMING GEN. -600 | COMPARE REGISTER CELL C4 | C3 | C2 | C1 | CA | SIGNALS FROM READ OUT MEANS -400 | SIGNALS ON LINES MD1 | MD2 | MD3 | M GATE 618 | C GATE 620 | RC GATE 622 | COMMENTS |
|---|---|---|---|---|---|---|---|---|---|---|---|---|---|---|
| 1 | A | ϕ | ϕ | ϕ | ϕ | 1 | 1 1 1 1 | TRUE | TRUE | TRUE | M>1 | C=0 | RC | |
| 2 | C | 1 | ϕ | ϕ | ϕ | 1 | 1 0 1 1 | TRUE | TRUE | FALSE | M>1 | C=1 | RC | |
| 3 | C | 1 | ϕ | 1 | ϕ | 1 | 1 0 1 1 | TRUE | TRUE | FALSE | M>1 | C=1 | RC | |
| 4 | C | 1 | ϕ | 1 | 1 | 1 | 1 0 1 1 | FALSE | TRUE | FALSE | M=1 | C=1 | $\overline{RC}$ | |
| 5 | D | 1 | ϕ | 1 | 1 | 1 | 0 0 0 0 | FALSE | FALSE | FALSE | M=0 | C=1 | $\overline{RC}$ | THE MARK CELL OF WORD 2 HAS BEEN SET TO 0 |
| 6 | F | 1 | ϕ | 1 | ϕ | 1 | 1 0 1 0 | TRUE | FALSE | FALSE | M=1 | C=1 | $\overline{RC}$ | |
| 7 | D | 1 | ϕ | 1 | ϕ | 1 | 0 0 0 0 | FALSE | FALSE | FALSE | M=0 | C=1 | $\overline{RC}$ | THE MARK CELL OF WORD 1 HAS BEEN SET TO 0 BY A WRITE OPERATION |
| 8 | F | 1 | ϕ | ϕ | ϕ | 1 | 0 0 0 0 | FALSE | FALSE | FALSE | M=0 | C=1 | $\overline{RC}$ | |
| 9 | F | ϕ | ϕ | ϕ | ϕ | 1 | 0 1 1 1 | FALSE | FALSE | TRUE | M=1 | C=0 | RC | |
| 10 | D | ϕ | ϕ | ϕ | ϕ | 1 | 0 0 0 0 | FALSE | FALSE | FALSE | M=0 | C=0 | $\overline{RC}$ | THE MARK CELL OF WORD 3 HAS BEEN SET TO 0 |
| 11 | E | SORT COMPLETE | | | | | | | | | | | | |

| WORDS | | SORTED |
|---|---|---|
| 1010 | - | ROW 1 |
| 1011 | - | ROW 2 |
| 0111 | - | ROW 3 |

FIG. 6

INVENTOR.
EDWIN S. LEE, III
BY
Christie, Parker & Hale
ATTORNEYS.

United States Patent Office 3,328,769
Patented June 27, 1967

3,328,769

INFORMATION SORTING DEVICE

Edwin S. Lee III, West Covina, Calif., assignor to Burroughs Corporation, Detroit, Mich., a corporation of Michigan Filed Apr. 21, 1964, Ser. No. 361,430
9 Claims. (Cl. 340—172.5)

This invention relates to apparatus for sorting words of information. More particularly, the present invention relates to apparatus for sorting digital words of information contained in a digital memory device.

Memory systems have been devised whereby a word of information stored in the memory system may be obtained without any indication of the physical location (address) of the particular word of information. These memory systems are known as content address memory systems or associative memory systems. The term "associative memory system" refers broadly to the type of memory systems in which selection and retrieval of information from the memory system is made by a specification of the contents of the desired information rather than a specification as to its physical location in the memory system. Associative memory systems generally have a memory device containing the actual memory cells in which the words to be sorted are stored and what is generally referred to as a compare register. Each memory cell in the compare register generally stores three different types of information. Two of the types of information are commonly referred to in the computer art as 0 and 1 states or bits whereas the third type of information is referred to as a don't care state (indicated by the symbol $\phi$). The information contained in the compare register is said to match a bit of information contained in the memory if both store either a 0 or a 1 bit. Information contained in the compare register is also said to match the bit of information contained in the memory if the memory contains either a 1 bit or a 0 bit and the information contained in the compare register is a don't care state ($\phi$). Associative memories are particularly advantageous for use in sorting words of information because the sorting operation may be accomplished without the time consuming process of serially searching all records stored in the memory.

Sorting devices and routines have been proposed for use with associative memory systems. Sorting, using these devices and routines, is accomplished by initially storing all don't care states in the compare register and then changing the storage content of the compare register until it matches and isolates one of the words contained in the memory.

One specific prior art method proposed for sorting, using an associative memory, requires that each of the bits in the compare register be set to either a 0 or a 1 in a predetermined sequence until all bits contained in the compare register are either 0 or 1. This method suffers from the serious disadvantage that unnecessary time is wasted in sequentially setting all bits in the compare register to either a 0 or a 1.

Another specific prior art method proposed for sorting, using an associative memory, requires that the bits in the compare register be converted from most significant to least significant until the compare register word isolates a particular word in memory. If, for example, there are no records contained in the memory of a certain bit configuration, needless time must be wasted in setting each of the bits in the compare register, moving from most significant to least significant, in search of the particular bit configuration even though the word with the particular bit configuration is not in the memory.

A third specific prior art method for sorting, using an associative memory, has been proposed which greatly decreases the amount of time required for sorting over the time required in the foregoing prior art methods for sorting. However, this method requires that all bit positions in the memory be detected which have the same kind of bit in all words. This arrangement, however, suffers from the disadvantage that complex and expensive gating and control circuitry is required to implement the arrangement. Additionally, the associative memory cells must be capable of responding to three different states of the compare cells.

In addition to the aforementioned disadvantages of the prior art method and apparatus for sorting, using an associative memory, each of the three prior art arrangements requires that the sequence with which the bits of the compare register are changed be selected so that the same word is not matched, selected and read out more than one time.

In contrast, the present invention is directed to a method and apparatus for sorting, using an associative memory, which allows the sorting operations to take place at a high rate of speed while reducing the complexity and amount of equipment required for sorting as compared with the foregoing high speed sorting apparatus. Also, the associative memory cells need only respond to two rather than three states of the compare cells and the compare cells need only store two types of binary bits. Additionally, an extra bit is reserved in the memory system for use in marking each word as it is isolated so as to prevent isolation of the word more than once.

Briefly, a specific embodiment of the present invention for sorting words in a memory comprises means for forming interrogation words which match and isolate the words to be sorted in a predetermined sequence, means for interrogating the memory with said interrogation words to determine the words being sorted which are isolated by said interrogation words, and means for modifying the isolated word to thereby force a mismatch between the isolated word and the interrogating words to prevent the same word from being isolated a second time.

Briefly, the method of sorting words represented by signals contained in a memory, in accordance with the present invention, includes the steps of forming interrogation words comprising electrical signals which match and isolate the words to be stored in a predetermined sequence, electrically interrogating the associative memory with said interrogation words to determine the words being sorted which are isolated by said interrogation words, and electrically modifying the isolated word to thereby force a mismatch between the isolated word and said interrogation words to prevent the isolated word from being isolated a second time.

These and other aspects of the present invention can be more fully understood with reference to the following description of the drawings, of which:

FIG. 2A shows a table illustrating the conditions under which binary 1 and 0 bits are stored in the mark cells of FIG. 1;

FIG. 2B shows a table illustrating the conditions under which reading and writing is accomplished in the memory cells of FIG. 1;

FIG. 2C shows a table illustrating the conditions under which control signals are formed at the indicated output circuits of the readout means of FIG. 1;

FIG. 6 shows a table illustrating the step by step operation of the system of FIG. 1 while sorting three records stored in the associative memory.

GENERAL DESCRIPTION

Figure 1:
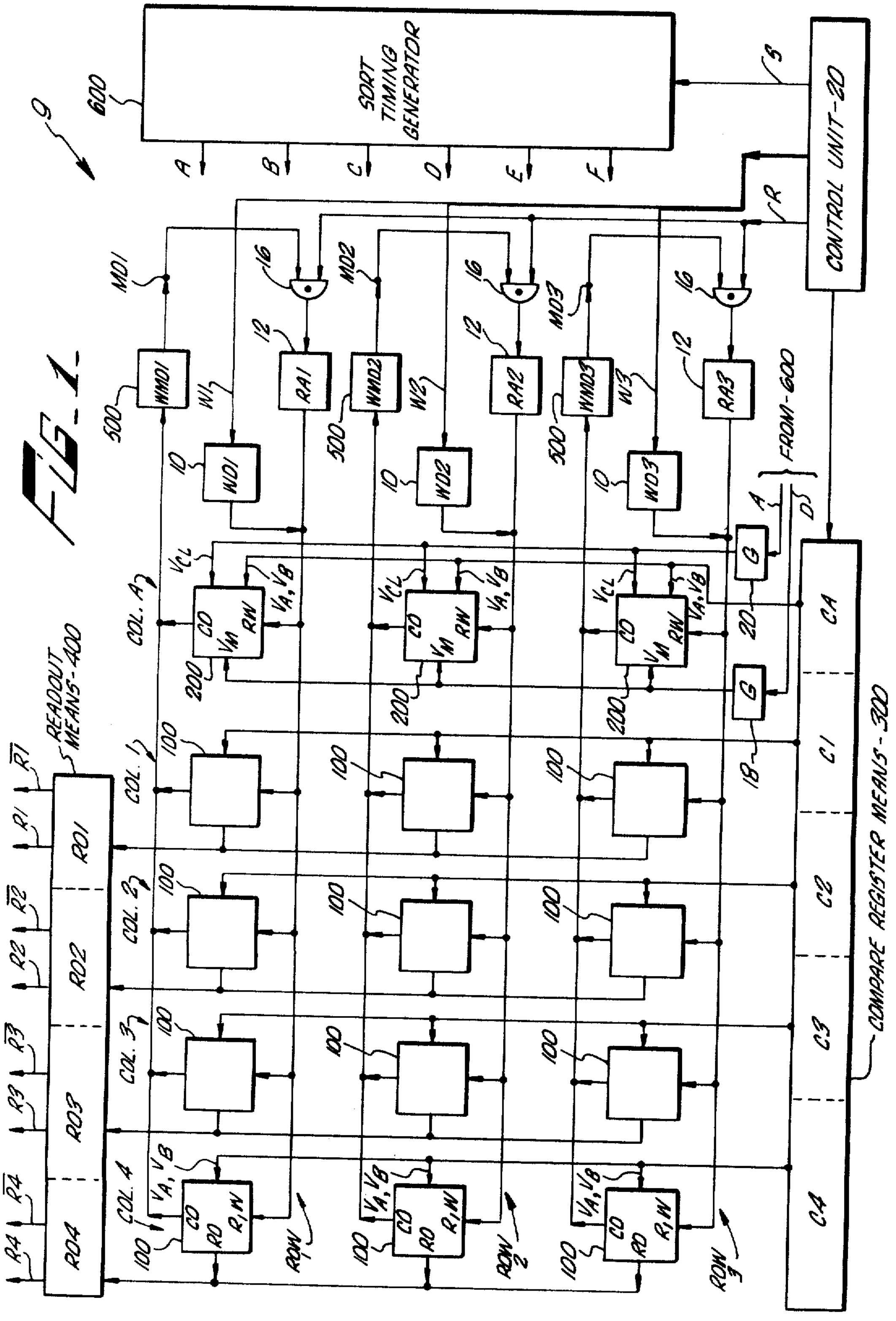
FIG. 1 shows a block diagram of a sorting system and embodying the present invention.

Refer now to the general block diagram of the sorting system shown in FIG. 1 and which embodies the present invention. The associative memory system of FIG. 1 includes a memory device 9 which has associative memory cells 100 arranged in rows and columns. A word of information is stored in each row. Each row of memory cells 100 includes a marker associative memory cell 200 for use in marking the corresponding word as having been matched and isolated. The marker cells 200 are arranged in column A of the memory 9. For purposes of illustration, only four columns (in addition to column A) and three rows of memory cells are shown. However, it should be understood that more rows and columns could be used. Proceeding from the least significant memory cell to the most significant memory cell, the four columns are numbered 1 through 4.

Also included in the system of FIG. 1 is an interrogation means or compare register means 300. The compare register means 300 includes five compare cells referenced by the symbols "CA," "C1," "C2," "C3" and "C4." The compare cells CA and C1 through C4 are associated with the memory cells in columns A and 1 through 4, respectively, of the memory 9. Interrogation words for the memory 9 are stored in the register means 300.

Each of the memory cells 100 and 200 are bistable devices capable of storing either a binary coded "1" bit or a "0" bit. The compare cells in the compare register means 300 are also capable of storing either a 1 bit or a 0 bit, but in addition each compare cell has the ability to store a third type of bit referred to as a "don't care" state (reference by the symbol $\phi$). However, only the don't care state and the 1 bit are used in the compare register means 300 in the sorting operation and are the only bits of concern in the present invention.

Each of the memory cells 100 and 200 in the same column are connected to the output circuit of the corresponding compare cell in the compare register means 300. To be explained in detail in a subsequent discussion, each of the cells 100 and 200 are capable of comparing the storage content of the corresponding compare cell with its own storage content and forming an output signal indicative of either a match or a mismatch condition. By definition, a match condition is one wherein the storage content of an associative memory cell contains either a 0 bit or a 1 bit and the corresponding compare cell contains either the identical bit or a don't care state.

A word match detector 500 is provided for each row in the memory 9. The word match detectors for rows 1 through 3 are referenced by the symbols "WMD1" through "WMD3." The word match detector 500 is adapted for detecting when the storage content of each cell in the corresponding row matches the storage content of the corresponding bit in the compare register means 300.

A readout means 400 is provided in the associated memory system of FIG. 1 which includes four readout circuits, one for each of the columns 1 through 4 of the memory 9. The readout circuits are referenced by the symbols "RO1" through "RO4," and have output circuits referenced by the symbols R1, $\overline{R1}$ through R4, $\overline{R4}$. The readout circuits are adapted for forming an output signal at the unprimed output circuits whenever one or more 1 bits are being read out of the corresponding column of the memory 9.

A write driver 10 is provided for each row of cells in the memory 9 and simultaneously applies a write control signal to each of the cells in the corresponding row. Also, a read amplifier 12 is provided for each row of cells in the memory 9. The read amplifiers 12 are adapted for simultaneously applying a read control signal to each of the memory cells in the corresponding row of the memory 9.

A sort timing generator 600 is provided for sequencing the operation of the system of FIG. 1 during a sorting operation.

With the general arrangement of the major circuits of FIG. 1 in mind consider briefly the operation thereof during a sorting operation. The sort flow chart shown in FIG. 5 should be referred to in the following description for a better understanding of the operation of the system shown in FIG. 1. The system of FIG. 1 sorts words in order beginning with the largest word and ending with the smallest word.

Initially, the words to be sorted are stored in the rows of the memory 9 using the write drivers 500 and the compare register means 300 as will be explained hereinbelow in the detailed description. Subsequently, don't care states are stored in each of the compare cells of the compare register means 300 except for compare cell CA. A 1 bit is stored in the compare cell CA. Also, a 1 bit is stored in each of the mark cells 200 of column A.

Each read amplifier 12 is arranged so that it causes the content of the corresponding row, which is matching the content of the compare register 300, to be read out. Since don't care bits are stored in each of the compare cells of the compare register means 300, the content of each row matches the content of the compare register means 300 and all rows are read out and the read out signals are applied to the corresponding readout circuits RO1 through RO4. It is important to note that only the content of those memory rows are read out which match the content of the compare register. In this manner the readout means 400 examines the content of only the matching rows.

Figure 5:
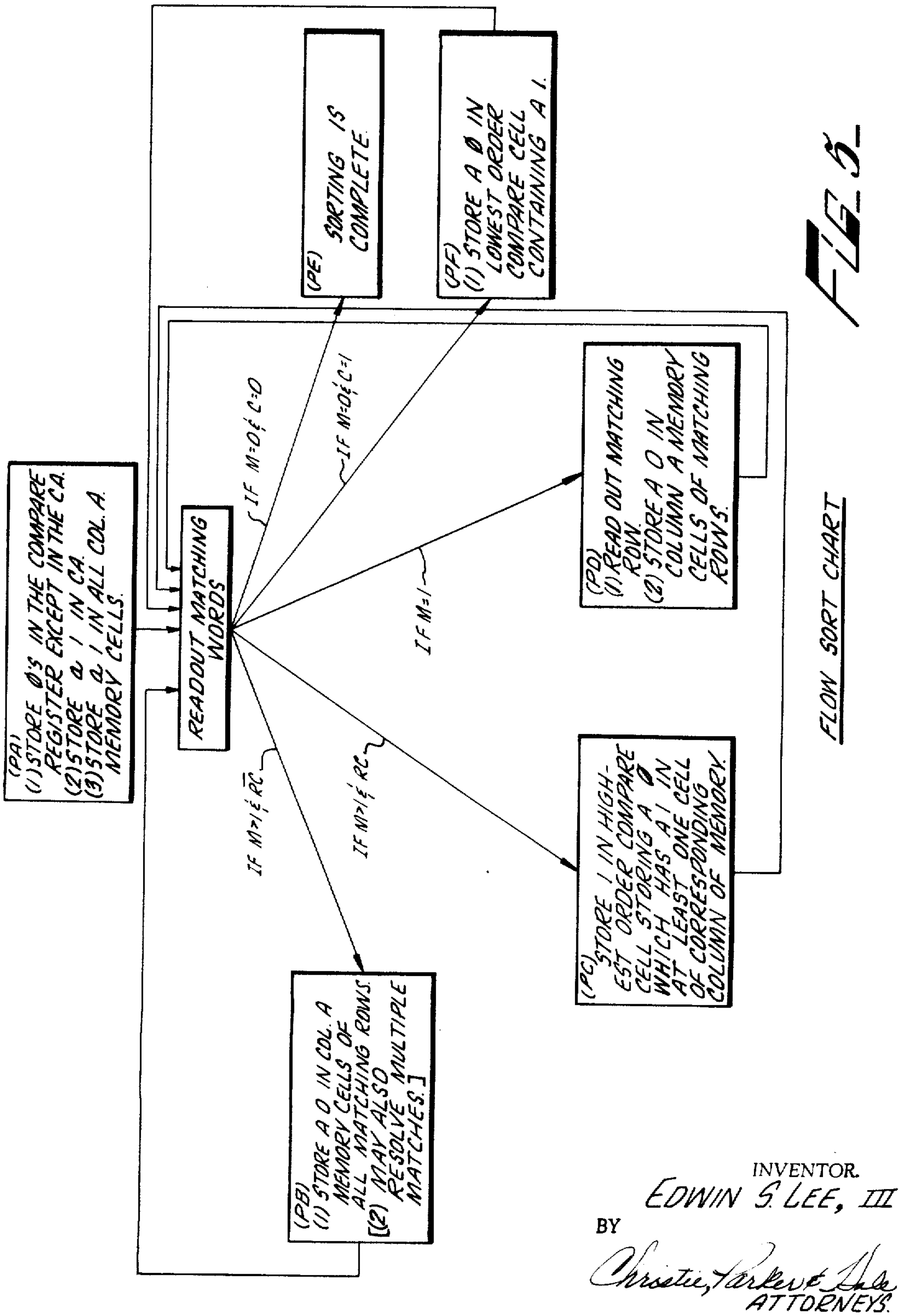
FIG. 5 shows a sort flow chart which illustrates the sequence of operation of the system of FIG. 1 during a sort operation and generally illustrates the method of the present invention.

If the content of more than one row matches the content of the compare register means 300 ($M>1$) and there is at least one don't care state in a compare cell which has a 1 bit in any one of the cells of the corresponding column of the memory 9 (RC), then a 1 bit is stored in the highest order compare cell which contains a don't care state and has at least one 1 bit in the corresponding column of the memory (see block PC of FIG. 5).

If the content of the compare register means 300 does not match the content of any of the rows in the memory 9 ($M=0$) and there is at least one 1 bit stored in the compare register means 300 ($C=1$), then a don't care state is stored in the lowest order compare cell which is storing a 1 bit (see block PF of FIG. 5).

If there is a single row in the memory 9, the content of which matches the content of the compare register means 300 ($M=1$), then a single word in the memory 9 has been isolated which is larger than any of the other words in the memory 9. The word in the matching row is then read out by energizing the corresponding read amplifier and the word is operated on by the system as desired. The operations which may be performed on an isolated word are numerous but are not of special importance in regard to the invention described herein. The isolated and matching word is then forced to mismatch the content of the compare register means 300 by storing a 0 bit in the mark cell 200 of the isolated and matching word. (Note compare cell CA contains a 1 bit.)

This operation is continued repeating steps as necessary until each of the words in the memory 9 has been isolated and read. In this manner, the words contained in the memory 9 are sorted in order beginning with the largest word and ending with the smallest words in the memory 9.

Once the sorting operation has been completed, there will be no matching words in the memory 9 ($M=0$) and there will be no 1 bits stored in the compare register means 300 ($C=0$). When this condition exists, the sorting operation is terminated and the system waits for a new sort command (see block PE of FIG. 5).

A special condition should be noted. If there are two or more words stored in the memory 9 which are identical, a condition will be reached in the system of FIG. 1 wherein more than one word in the memory matches the content of the compare register ($M>1$) assuming that there are no compare cells in the compare register means containing a don't care state with a 1 bit in the corresponding column of the memory $(\overline{RC})$ and more than one word matches ($M>1$) a 0 bit will be stored in the mark cells of column A of all matching rows and the matching words will be read out. Although no such arrangement is shown, an arrangement may be incorporated to resolve multiple matches such as that shown and described in the copending application entitled "Storage Apparatus," bearing the Ser. No. 213,278, and filed on July 30, 1962, in the name of Edwin S. Lee III.

In summary, don't care states are initially stored in each of the compare cells of the compare register means. Subsequently, the storage content of each of the compare cells are changed in a predetermined sequence determined by the words contained in the memory cells causing the content of the compare register to match and isolate the words contained in the rows of the memory cells in a predetermined sequence corresponding to the order of sorting. The storage content of the mark cell of a row containing an isolated word is set so that it causes a mismatch with the content of the compare register. In this manner, the sorting operation proceeds isolating word after word in the memory 9 until the contents of the memory are sorted.

DETAILED DESCRIPTION OF CIRCUITS

Figure 2:
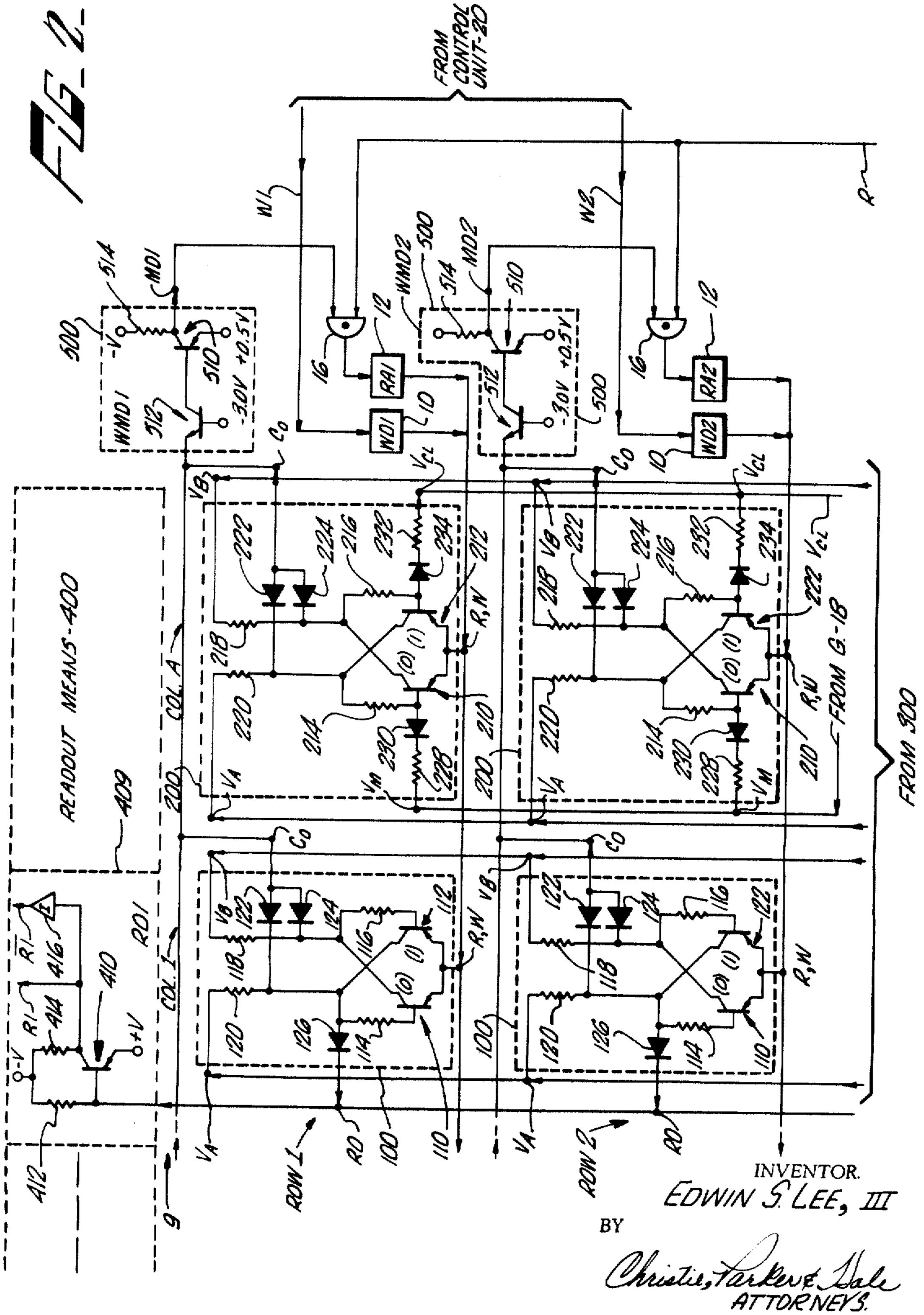
FIG. 2 shows a schematic diagram, partly in block diagram form, of the details of one bit in the readout means, the details of four memory cells in the system of FIG. 1 and a portion of the associated control circuitry for the system shown in FIG. 1.

Refer now to the schematic diagram shown in FIG. 2. The schematic diagram of FIG. 2 shows the circuitry in the readout means 400 for readout circuit RO1, the details of the circuits for columns A and 1 of rows 1 and 2 and part of the associated control circuitry for operating the system which is also shown in FIG. 1.

*Memory cells 100 and 200*

Refer now specifically to the details of the associative memory cell 100 and the mark associative memory cell 200 shown in FIG. 2.

As indicated in FIGS. 1, and 2, the associative cell 100 has input terminals referenced by the symbols $V_A$, $V_B$, and R, W and output terminals reference by the symbols $C_O$ and R0. Similarly, the mark associative cells 200 have input terminals $V_A$, $V_B$, and R, W, and an output terminal $C_O$. In addition, however, the mark associative cells 200 have input terminals $V_M$ and $V_{CL}$ but do not have an output terminal R0.

The cells 100 and 200 are quite similar and both have identical storage and compare capabilities. Also, write operations take place in both cells 100 and 200 by applying appropriate write control signals to the terminals R, W.

However, the associative cells 100 differ from the associative cells 200 in that read operations take place by applying read control signals to the terminals R, W of the cells 100 whereas mark cell 200 does not have read capabilities. Also, bits of information are written into mark cells 200 by applying appropriate write control signals to terminals $V_M$, $V_{CL}$ and R, W, as explained in detail below.

The details of associative memory cell 100 of row 1, column 1, will now be explained. However, it should be noted that the details of the other cells 100 are essentially the same. Refer now specifically to the associative memory cell 100 at row 1, column 1, as shown in FIG. 2. The cell 100 includes a pair of PNP type transistors 110 and 112. The emitter electrodes of the transistors are connected in common to the read-write (R, W) terminal. The R, W terminal of cell 100 (at row 1, column 1) is in turn connected to a source of reference potential including the read amplifier 2 (RA2) and the write driver 2 (WD2). The collector electrodes of the transistors 110 and 112 are serially connected through identical resistors 118 and 120 to the terminals $V_B$ and $V_A$, respectively. The base electrodes of the transistors 110 and 112 are serially connected to the emitter electrodes of the opposite transistors by means of resistors 114 and 116, respectively. In this manner, the control or base electrode of the transistors 110 and 112 are regeneratively cross-coupled through their respective impedance means to the output or collector electrode of the opposite transistor. Also, the output-control circuits including the base and collector electrodes are individually and symmetrically connected through impedance means to the respective terminals $V_A$ and $V_B$ which in turn are connected to separate output circuits of the compare cells.

The compare register means 300 applies negative potential signals to the terminals $V_A$ and $V_B$ of the cells 100 for rendering the cells 100 conductive in one of two stable conditions. When transistor 110 is switched into a conductive condition, transistor 112 is biased into a nonconductive condition and conversely when transistor 112 is switched into a conductive condition, transistor 110 is biased into a nonconductive condition. By definition, memory cell 100 is said to store a binary 0 bit when transistor 110 is in a conductive condition, and cell 100 is said to store a binary 1 bit when transistor 112 is in a conductive condition.

A detecting device comprising a pair of asymmetrically connected elements are connected between the collector electrodes of the transistors 110 and 112 and the output terminal $C_O$. The asymmetrically conductive elements are diodes 122 and 124 having their anode electrodes connected in common to the output terminal $C_O$ and their cathode electrodes connected to the collector electrodes of the transistors 110 and 112. To be explained subsequently, the detecting device is adapted for forming a unique output signal indicative of a match between the cell 100 and the storage content of the corresponding compare cell in the compare register means 300.

A readout device comprising an asymmetrically conductive element, namely diode 126, is connected between the collector electrode of the transistor 112 and the output terminal R0. The anode electrode of the diode 126 is connected to the collector electrode of the transistor 112 and is used in conjunction with the readout means 400 for providing an output signal indicative of the storage content of the cell 100.

Refer now to the mark cell 200 in row 1 of the memory 9. Again, it should be noted that the mark cell 200 in row 1 is essentially the same as the mark cell 200 in rows 2 and 3. As shown in FIG. 2, the mark cell 200 is similar to the cells 100. However, the readout diode 126 is removed and two additional input circuits are provided and are connected to the terminals $V_M$ and $V_{CL}$. The elements 110 through 124 of the cell 100 are also included in the mark cell 200 and are connected together in an identical configuration. The elements 110 through 124 of the cell 100 are referenced by the symbols 210 through 224, respectively, in the mark cell 200.

The terminal $V_M$ is connected to the base electrode of the transistor 210 through the serial connection of a resistor 228 and a diode 230. The diode has its anode electrode connected to the base electrode of the transistor 210 and one end of the resistor 228 is connected to the terminal $V_M$. A similar circuit arrangement is connected between the base electrode of the transistor 212 and the terminal $V_{CL}$ including a resistor 232 and a diode 234.

Consider now the interconnections of the cells 100 and 200. Each of the terminals $V_A$ in each column of the memory 9 (see FIGS. 1 and 2) are connected together in common to an output circuit of the corresponding compare cell. Likewise, terminals $V_B$ of the cells 100 in each column of the memory 9 are connected together in common to another output circuit of the corresponding compare cell (see FIGS. 1 and 2). The output terminal R0 of the cells 100 in each columns 1 thronugh 4 are connected together in common to the respective readout circuits RO1 through RO4 of the readout means 400 (see FIG. 1). The input terminal R, W of the cell 100 and 200 in each row are connected together in common to the output circuits of the corresponding write driver 10 and read amplifier 12. The terminal $C_O$ of the cells 100 and mark cells 200 in each row are connected together in common to the input circuit of the corresponding word match detector 500.

The input terminal $V_M$ of each of the mark cells 200 are connected together in common to the output circuit of a control gate 18 (see FIG. 1). Similarly, the terminal $V_{CL}$ of each of the mark cells 200 are connected together in common to the output circuit of a control gate 20.

Each row in the memory 9 has a separate AND gate 16 for controlling the read driver 12 in the corresponding row. Consider the AND gate 16 for row 1. The AND gate 16 in row 1 has its input circuits connected to the output circuit MD1 of WMD1 and the R output circuit of a control unit 20 (see FIGS. 1 and 2).

*Readout means 400*

Consider now the circuits of the readout means 400 shown in FIG. 2. The readout means 400 includes a readout circuit 409 for each column in the memory 9 except for column A. Only the readout circuit RO1 for column 1 is shown in detail in FIG. 2 and will be described. The readout circuits RO2 through RO4 are identical to readout circuit RO1. The readout circuit RO1 includes a PNP transistor 410 having its emitter electrode connected to a slightly positive potential source of potential (not shown) referenced by the symbol +V and its collector electrode serially connected through a resistor 414 to a large negative source of potential (not shown) referenced by the symbol —V. Similarly, the base electrode of the transistor 410 is serially connected through a resistor 412 to the —V source of potential. One output circuit of the readout circuit RO1 is referenced by the symbol R1 and is connected directly to the collector electrode of the transistor 410. A second output circuit of the readout circuit RO1 is referenced by the symbol $\overline{\text{R1}}$ and is connected through an inverter circuit 416 to the collector electrode of the transistor 410.

Consider now the details of the circuits of the word match detector 1 (WMD1). The word match detector 1 is identical to the word match detector of rows 2 and 3, therefore, only word match detector 1 (WMD1) will be explained. The WMD1 includes a PNP transistor 510 and an NPN transistor 512. The collector electrode of the PNP transistor 510 is serially connected through a load resistor 514 to the output of the —V source of potential. The emitter electrode of the transistor 510 is connected to a source of potential (not shown) referenced by the symbol +0.5V. The +0.5V source of potential provides a +.5 volt signal to the emitter electrode of the transistor 510. The base electrode of the transistor 510 is connected to the collector electrode of the transistor 512. The emitter electrode of the transisor 512 is connected to the $C_O$ output terminal of each of the cells in row 1 of the memory 9. The base electrode of the transistor 512 is connected to the output of a source of potential (not shown) which is referenced by the symbol —3.0V. The —3.0V source of potential applies a —3 volt signal to the base electrode of the transistor 512.

Each word match detector has an output circuit taken at the collector electrode of the transistor 510. The output circuits of the word match detectors WMD1, WMD2 and WMD3 are referenced by the symbols "MD1," "MD2" and "MD3". The signals at the output circuits MD1 through MD3 are said to be true whenever each cell in the corresponding row matches the corresponding compare cell and are said to be false if any one or more of the cells in the corresponding row does not match the corresponding compare cell.

*Write operation*

Consider now a write operation in the memory 9. Whenever a word is to be written into a particular row of the memory 9, the control unit 20 applies a control signal to the input circuit of the corresponding write driver. The write driver in turn applies a control signal to the R, W terminal of the cells 100 in the corresponding row causing an entire word to be written into the cells in the row. For example, if a word is to be written into row 1, the control unit 20 applies a control signal at the output circuit W1 which in turn applies a write control signal to the R, W terminals in row 1. This causes the complement of each cell in the compare register means to be written into the memory cells of row 1. The complement of a word to be written into a particular row is stored in the compare register means by the control unit 20.

Refer now to the table shown in FIG. 2B and consider how a bit is written into a particular associative cell. As indicated, when a write driver applies a control signal to the R, W terminal of one of the cells 100 or 200, the complement of the content of the corresponding compare cell in register means 300 is stored in the cell. The control signal formed at the output circuit of the write driver 10 is a —2 volt signal.

By way of example, assume that a binary 1 bit is contained in compare cell C1 of the compare register means 300. Referring to FIG. 3A, it will be noted that the signal applied at terminal $V_A$ and $V_B$ will be —6 volt and —2 volt signals, respectively. The —2 volt signal applied at the R, W terminal by the write driver WMD1 causes the emitter electrodes of the transistors 110 and 112 (of cell at row 1, column 1) to drop to —2 volts which is equal to the potential applied to the terminal $V_B$. This causes the potential at the base electrode of the transistor 112 to be at essentially the same potential as that at its emitter electrode. The —6 volt signal at the terminal $V_A$ causes the base electrode of the transistor 110 to be biased negative with respect to the —2 volt signal applied at its emitter electrode. As a result, transistor 110 is biased into a conductive condition and transistor 112 is biased into a nonconductive condition. Since transistor 110 is in a conductive condition, a binary 0 bit is now contained in the cell at row 1, column 1. When R, W returns to ground potential the cell continues to store a binary 0 bit. The operation for writing a 1 bit in a cell is identical to that described for writing a 0 bit except that the potentials applied to terminals $V_A$ and $V_B$ are reversed and transistor 112 is switched into a conductive condition and transistor 110 is switched into a nonconductive condition.

The operation of writing the content of a compare cell into a memory cell is identical for the mark cells 200 as that described hereinabove for the associative cells 100.

Consider now a write operation during which the storage content of a mark cell 200 is changed from 1 to 0. This write operation is entirely different from a write operation during which the complement of the content of the entire compare register means is written into a row of memory. FIG. 2A shows the condition under which binary 1 and 0 bits are written into the mark cells 200 using the control lines $V_M$, $V_{CL}$ and R, W. Normally, the gate 18 applies a large positive signal to the terminal $V_M$ of each of the mark cells 200 in column A. The large positive signal is of sufficient magnitude that the diodes 230 are always reverse biased causing the base electrode of the corresponding transistors 210 to be essentially disconnected from the input terminal $V_M$. A control signal applied to an output circuit D of the sort timing generator 600 causes the gate 18 (see FIG. 1) to connect the terminals $V_M$ of the mark cells 200 to ground potential.

To be explained in more detail, the read amplifiers 12, in a row which contains a matching word, applies a read signal to the R, W terminals of the cells in the corresponding row in coincidence with the control signal applied at the output circuit D of the sort timing generator 600. As a result, the read amplifier 12 applies a +2 volt signal to the R, W terminal of one of the mark cells 200 in coincidence with the 0 volt signal applied to the terminal $V_M$. This coincidence of signals causes the transistor 210 to be biased into a conductive condition causing the storage content of a particular mark cell 200 in question to be changed from a 1 bit to a 0 bit.

Assume now that a 1 bit is to be written in each of the mark cells 200 of column A. The control gate 20 normally applies a large positive signal to the terminals $V_{CL}$ of the mark cells 200. This causes the diodes 234 in each of the mark cells 200 to be reverse biased and in effect disconnect the terminals $V_{CL}$ from the base electrode of each of the transistors 212. However, the gate 20 has an input circuit connected to an output circuit of the sort timing generator 600 which ouput circuit is referenced by the symbol A. A control signal is applied at the output circuit A at the beginning of each sort operation and the gate 20 is responsive thereto for applying a −6 volt signal to the terminals $V_{CL}$ of each of the mark cells 200. The −6 volt signal at the terminal $V_{CL}$ causes the diode 234 of each mark cell 200 to be forward biased and allow the base electrode of the corresponding transistor 212 to be biased toward −6 volts. As a result, the transistor 212 is switched into a conductive condition causing the transistor 210 to be switched into a nonconductive condition. This causes a 1 bit to be written in each of the mark cells 200 in row A.

*Read operation*

Assume now that a read operation is to take place in row 1 of the memory 9. Normally the anode electrode of the diode 126 in one of the memory cells 100 is at either ground potential (when cell 100 stores a 1 bit and transistor 112 is conductive) or at a negative potential of about −2 volts or −4 volts (when cell 100 stores a 0 bit and transistor 112 is nonconductive). The electrodes of diode 126 will be at −2 volts if terminal $V_A$ is at −2 volts and will be at −4 volts if terminal $V_A$ is at −6 volts. The reason that the electrodes of diode 126 will be at −4 volts, rather than −6 volts, is that the forward biased base to emitter electrodes of transistor 512 and the forward biased diode 122 clamps the anode of diode 126 at about 1 volt below the −3 volt power supply or at −4 volts. This allows resistor 412 of the corresponding readout circuit 409 to bias transistor 410 thereof into a conductive condition. When the transistor 410 is in a conductive condition, the output terminal R1 of the readout circuit is at approximately 0 volts potential. The inverter circuit 416 of the readout circuit inverts the signal applied at the collector electrode of the transistor 410 and forms an output signal approximately equal to that out of the −V source of potential.

A read operation takes place whenever the control unit 20 forms a control signal at the output circuit R and a control signal is formed at the output of the corresponding word match detector. Therefore, assuming control signals at R and MD1, gate 16 (of row 1) causes RA1 to apply a read control signal of +2 volts potential to the R, W terminal of each cell in row 1. The +2 volt read signal applied at the terminal R, W causes the emitter electrode of the transistors 110 and 112 to rise to +2 volts. Assuming that the cell 100 is storing a 1 bit (transistor 112 is in a conductive condition) the collector electrode thereof, hence the cathode electrode of the diode 126, is raised to approximately +2 volts. However, assuming that a binary 0 bit is stored in the cell (transistor 110 is in a conductive condition), the collector electrode of transistor 112 stays at approximately −4 volts (since transistor 112 is in a nonconductive condition) and the potential at the anode electrode of the diode 126 remains essentially unchanged.

When a 1 bit is read out of a cell, the anode electrode of the diode 126 is raised to +2 volts potential and the cathode electrode and the input to the readout circuit RO1 are also raised to approximately +2 volts potential. If a 0 bit is stored in a cell, the input signal to the readout circuit is unchanged and remains at essentially the same level which exists without the read signal as described hereinabove.

Assuming the cell at row 1 column 1 is storing a 1 bit (transistor 112 is in a conductive condition) and a +2 volt read signal is formed at terminal R, W, the diode 126 raises potential at the base electrode of the transistor 410 (in readout circuit RO1) above the potential at the output of he source of potential +V. Therefore, the transistor 410 is biased into a nonconductive condition. When transistor 410 is nonconductive, the potential at the output terminal R1 drops to approximately the same potential as that out of the −V source of potential and the inverter circuit 416 forms a 0 volt signal at the output circuit $\overline{R1}$.

The output terminals R0 of each of the cells in a column are connected together to the base electrode of the transistor 410. Therefore, whenever there is one or more 1 bits being read out of a column, a control signal is formed at the R1 output circuit essentially equal to that from the −V source of potential. Whenever all cells being read out in a column contain 0 bits, or a read operation is not taking place, the transistor 410 in the corresponding column remains in a conductive condition and the potential at the R1 output circuit remains essentially at 0 volts.

The operation of the readout circuits and the cells for the columns 2 through 4 is essentially identical and can be understood with reference to the read operation described for column 1.

*Compare operation*

Assume now that a compare operation is to be performed by the associative cells. Each of the memory cells continuously compares the content thereof with the content of the corresponding compare cell in the compare register 300. The detecting device including diodes 122 and 124 (222 and 224 for memory cells 200) detect whether the storage content of the corresponding memory cell matches the content of the corresponding compare cell. The anode electrodes of the diodes 122 and 124 (or 222 and 224) are biased to the lowest potential applied to the cathodes of the two diodes. Thus, if a memory cell stores a binary 1 bit and the corresponding compare cell stores a 0 bit, the potential at terminal $V_B$ will be −6 v. (see FIG. 3A) and transistor 110 thereof will be in a nonconductive condition. Therefore, the diode 124 (or 224) will conduct causing transistor 512 to conduct. The base-emitter junction of transistor 512 and the diode 124 will clamp the collector electrode of the transistor 110 at approximately −4 v. and terminal $C_O$ at approximately −3.5 v.

Similarly, if a memory cell contains a 0 bit and the corresponding compare cell contains a 1 bit, terminal $V_A$ will be at −6 v. and transistor 112 (or 212) will be in a nonconductive condition causing the diode 122 (or 222) to conduct. As a result, the transistor 512 is switched into a conductive condition and the corresponding terminal $C_O$ is based to approximately −3.5 volts potential. Thus, in case of a mismatch between a memory cell and the corresponding compare cell, the signal at the corresponding terminal $C_O$ is always −3.5 volts.

However, should the storage content of a memory cell match the content of the corresponding compare cell, the terminal $C_O$ will be biased to approximately 0 volts potential. For example, if a binary 1 bit is stored both in a memory cell and in the corresponding compare cell, then a −6 volt potential will be applied to the terminal $V_A$ and transistor 112 (or 212) will be in a conductive condition. Thus, the collector electrode of the transistor 112 will be essentially short-circuited to the terminal R, W (which is at 0 volts potential) causing the cathode electrode of the diode 124 to be biased at approximately 0 volts potential. Thus, in cases where the content of a memory cell and the corresponding compare cell match, neither diode 122 nor 124 will conduct causing the corresponding terminal $C_O$ to be essentially open-circuited. With terminal $C_O$ open-circuited, the transistor 512 of the corresponding word match detector 500 will be switched into a nonconductive condition. However, it should be noted that one of the other terminals $C_O$ in the same row may be biased to a negative potential, by its corresponding memory cell at the very same time, and if this is the case, all terminals $C_O$ in the same row will be biased to the same negative potential. Thus, if any terminal $C_O$ is at a negative potential, the transistor 512 in the corresonding word match detector 500 will be switched into a conductive condition.

In summary, whenever there is a mismatch between any cell 100 in one row and the content of the corresponding compare cell, the transistor 512 of the corresponding word match detector is switched into a conductive condition.

It should be carefully noted that when a don't care state is stored in a compare cell the signal applied to terminal $V_A$ and $V_B$ in the corresponding columns are both −2 volts (see FIG. 3A). Therefore, neither diode 122 nor diode 124 of the corresponding memory cell, can conduct thereby indicating a match in that particular memory cell.

A mismatch in any memory cell in a row causes its own terminal $C_O$ and the terminal $C_O$ at each of the other memory cells in the same row to be biased to −3.5 volts potential. As already pointed out herein above, this causes the emitter electrode of the transistor 512 (in the corresponding word match detector) to be biased to a −3.5 volts potential causing the transistor 512 to be biased into a conductive condition. This in turn causes the transistor 510 to be biased into a conductive condition. With the transistors 510 and 512 in conductive conditions, essentially a 0 volt potential is applied at the output circuit of the corresponding word match detector 500. A 0 volt potential at the output circuit of a word match detector is defined herein as a false signal and indicates a mismatch in at least one of the cells in the corresponding row of the memory.

Conversely, if there is a match between each of the cells in a row and the corresponding compare cell, the terminal $C_O$ of each of the cells in the row will be biased to approximately −2 volt potential causing a −2 volt signal at the emitter electrode of the transistor 512 of the corresponding word match detector. A −2 volt potential at the emitter electrode of the transistor 512 causes the transistor to be reverse biased causing both transistors 512 and 510 to be switched into a nonconductive condition. A nonconductive condition of transistors 510 and 512 causes the potential at the output circuit of the word match detector to drop to a negative potential approximately equal to that out of the −V power supply. The large negative output signal of a word match detector 500 formed when all cells in the row match is defined as a true output signal.

Other details of the associative memory cells and a similar associated memory system are shown and described in a copending patent application entitled "Associative Memory" bearing Ser. No. 278,021 and filed on May 6, 1963 in the name of Edwin S. Lee III.

*Sort timing generator #600*

Figures 4, 4A:
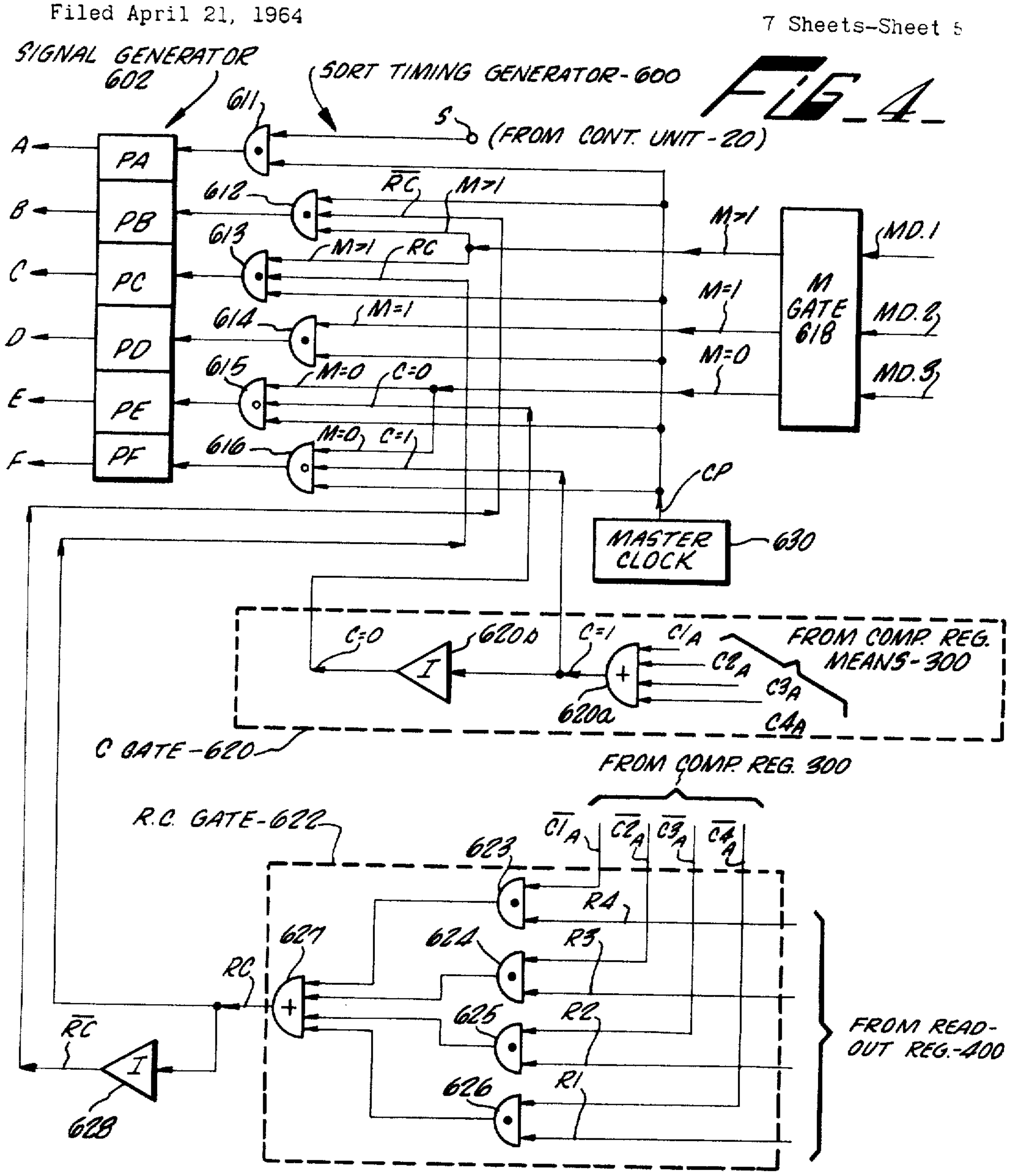
FIG. 4 shows a block diagram of the details of a timing generator for use in the system of FIG. 1.
FIG. 4A shows a table illustrating the output circuits of the M gate (shown in FIG. 4) for the various possible input signals to the M gate.

Refer to the sort timing generator 600 shown in FIG. 4. Included is a signal generator 602 which has six states of operation referred to as phase A (PA), phase B (PB), phase C (PC), phase D (PD), phase E (PE), and phase F (PF). Corresponding to each phase of operation of the signal generator 602 is an output circuit. The output circuits have symbols similar to the corresponding phase of operation and are referenced by the symbols A, B, C, D, E and F. Whenever the signal generator 602 is in one of the six possible phases of operation, the corresponding output circuit receives a continuous control signal.

The signal generator 602 is set into one of its six possible states of operation in response to control signals applied thereto by AND gates 611 through 616. A control signal applied to the signal generator 602 by the AND gate 611 causes the signal generator 602 to be set into phase A; a control signal applied to signal generator 602 by the gate 612 causes the signal generator 602 to be set into phase B, etc.

Before considering the input circuits to each of the AND gates 611 through 616, three important gates will be considered which are used in controlling the AND gates 611 through 616. The three gates of importance are an M gate 618, a C gate 620 and a RC gate 622.

The M gate 618 is provided for applying an output signal at one of three output circuits thereof depending on the number of rows in the memory 9, the content of which match the content of the compare register means 300. The three output circuits of the M gate 618 are referenced by the symbols $M=0$, $M=1$ and $M>1$. FIG. 4A is a truth table illustrating the conditions under which the various output circuits of the M gate 618 receive control signals.

The M gate 618 has its input circuits connected to the output circuits MD1, MD2 and MD3 of the word match detectors 1, 2 and 3 (see FIGS. 1 and 2). If the content of none of the rows in the memory 9 match the content of the compare register means 300, a control signal is applied at the $M=0$ output circuit. Whenever the content of a single row in the memory 9 matches the content of the compare register means 300, a control signal is applied at the $M=1$ output circuit of the M gate 618. When the content of more than one of the rows in the memory 9 match the content of the compare register means 300, a control signal is applied at the $M>1$ output circuit of the M gate 618.

The C gate 620 indicates whether there is at least a single 1 bit contained in the compare register means 300. The C gate 620 has an output circuit referenced by the symbol $C=1$. The C gate 620 has an OR gate **620*a* having an output circuit referenced by the symbol $C=1$. Each one of the input circuits to the OR gate 620*a* is connected to an output circuit of one of the compare cells of the compare register means 300**. The output circuits of the compare cells to which the input circuits are connected are referenced by the symbols $C1_A$, $C2_A$, $C3_A$, and $C4_A$. Whenever a 1 bit is contained in compare cell C1, a control signal is applied at the $C1_A$ output circuit; whenever a 1 bit is contained in compare cell C2, a control signal is applied at the $C2_A$ circuit, etc.

The OR gate **620*a*** applies a control signal at the $C=1$ output circuit whenever one or more of the compare cells C1 through C4 contain a 1 bit causing one or more of the input circuits thereto to receive a control signal.

The C gate 620 also includes an inverter circuit **620*b* which inverts the output signal of the gate 620*a*. The inverter circuit 620*b*** has an output circuit referenced by the symbol $C=0$ which receives a control signal whenever a control signal is not applied at the $C=1$ output circuit and to which no control signal is applied if a control signal is applied at the $C=1$ output circuit.

Refer now to the RC gate 622. The RC gate 622 has an output circuit referenced by the symbol RC to which a control signal is applied whenever there is at least one compare cell contained in the compare register means 300 which has a don't care (φ) state stored therein and a 1 bit contained in at least one of the cells being read out in the corresponding column of the memory 9. The RC gate 622 has a $\overline{RC}$ output circuit which receives a control signal whenever there are no compare cells having a don't care state stored therein with a 1 bit contained in at least one of the cells being read out in the corresponding column of the memory 9.

The RC gate 622 has a bank of AND gates 623 through 626. The output circuit of the AND gates 623 through 626 are connected to the input circuits of an OR gate 627. The output circuit of the OR gate 627 is connected to the output circuit RC. The output circuit RC is in turn connected through an inverter circuit 628 to the $\overline{RC}$ output circuit.

Refer now to the input circuits of the AND gates 623 through 626. The AND gate 623 has its input circuits connected to an output circuit $\overline{C4}_A$ of the compare cell C4 and the R4 output circuits of the readout means 400. The AND gate 624 has its input circuits connected to the $\overline{C3}_A$ output circuits of the compare cell C3 and the R3 output circuit of the readout means 400. Similarly, AND gates 625 and 626 have input circuits connected to the output circuits $\overline{C2}_A$, R2 and $\overline{C1}_A$, R1. To be explained in connection with the compare register means 300, a control signal is applied at the $\overline{C1}_A$ of the $\overline{C4}_A$ output circuits whenever the corresponding compare cells C1 through C4 are storing a don't care state.

As mentioned hereinabove, a control signal is applied at the R1 through R4 output circuits of the readout means 400 whenever a 1 bit is being readout of at least one of the cells in the corresponding columns 1 through 4. Thus, the AND gate 623 applies a control signal to the OR gate 627 whenever a don't care bit is stored in compare cell 4 and there is at least a single 1 bit readout of column 4. The operations of AND gates 624 through 626 are similar to that of gate 623.

With the gates 618, 620 and 622 in mind, refer now to the input circuits of the AND gates 611 through 616. The AND gate 611 has its input circuits connected to the output circuits of the control unit 20 (see FIG. 1) and the output circuit of a master clock 630. The master clock 630 continuously forms clock pulses at its output circuit. Therefore, the AND gate 611 applies a control pulse to the signal generator 602 causing it to step into phase A (PA) whenever a control signal is applied at the S output circuit of the control unit 20 in coincidence with a clock pulse.

The AND gate 612 has its input circuits connected to the output circuit of the master clock 630 and the output circuits RC and $M>1$.

The AND gate 613 has its input circuits connected to the output circuits $M>1$ and RC and to the output circuit of the master clock 630. The AND gate 614 has input circuits connected to the output circuits $M=1$ and the output circuit of the master clock 630. The AND gate 615 has input circuits connected to the output circuits $M=0$ and $C=0$ and to the output circuit of the master clock 630. The AND gate 616 has input circuits connected to the output circuits $M=0$ and $C=1$ and the output circuit of the master clock 630.

*Compare register means 300*

Figure 3:
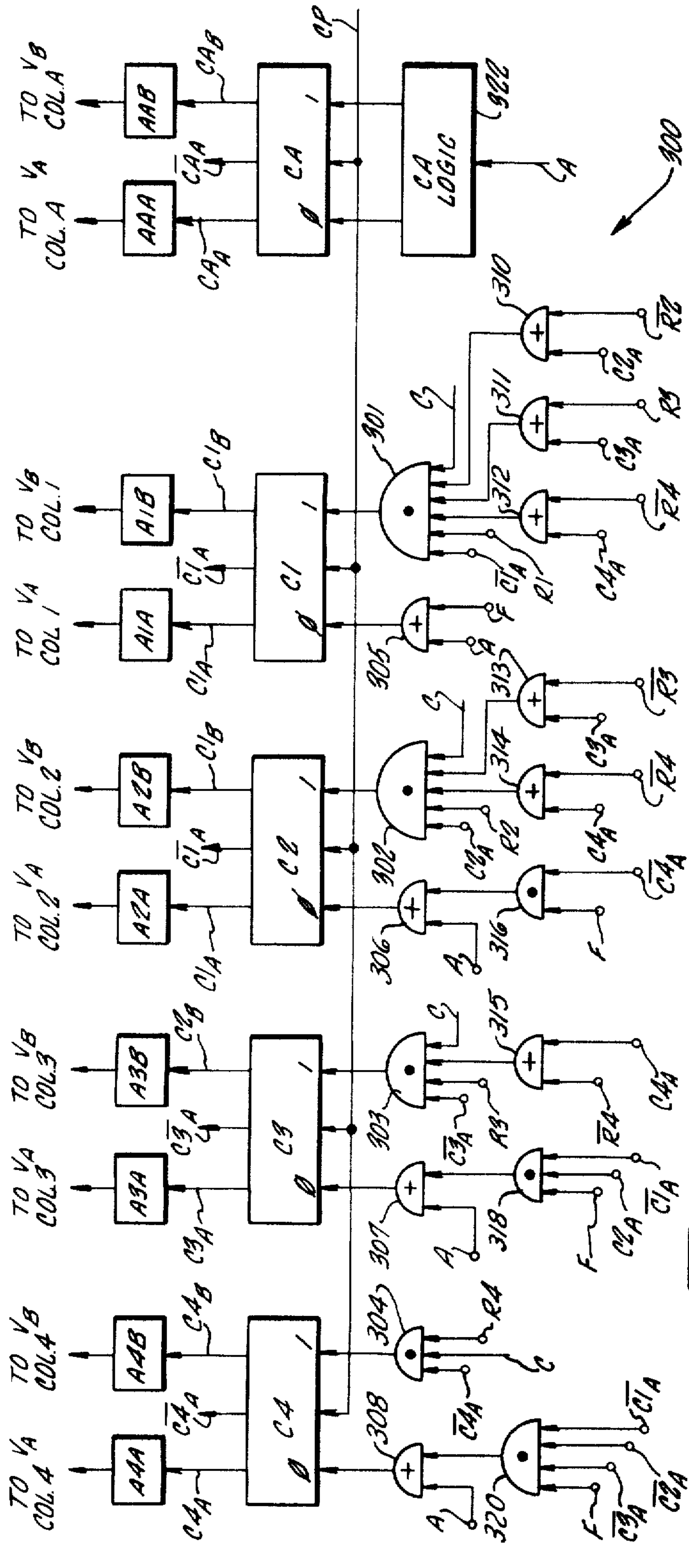
FIG. 3 shows a schematic diagram, partly in block diagram form, of the details of the compare register shown in FIG. 1.
Figure 3A:
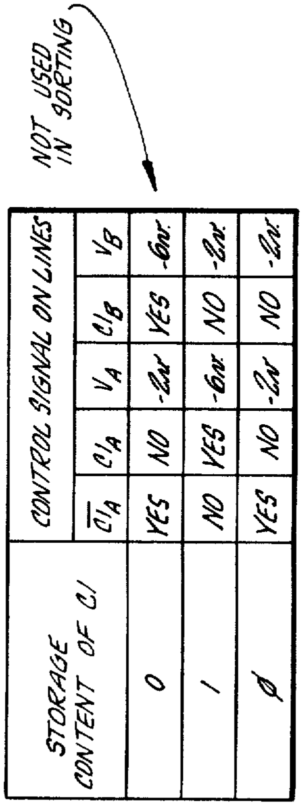
FIG. 3A shows a table illustrating the signals at the output circuits of the compare cells, shown in FIGS. 1 and 3, corresponding to each of the three possible states of operation of the compare cells.

Refer now to the details of the compare register means 300 which are shown in FIG. 3. As previously pointed out, the compare register means 300 includes five compare cells referenced by the symbols CA and C1 through C4. As indicated in FIG. 3A, the compare cells have three different possible states and can store three different types of bits of information; namely, a 0 bit and a 1 bit and a don't care ($\phi$) state. However, only two of the different types of bits of information are needed for sorting; namely, the 1 bit and the don't care ($\phi$) state. A 0 bit is not stored in the compare register during a sorting operation.

The input circuits for storing 1 bits and don't care ($\phi$) states in the compare cells are shown in the lower part of FIG. 3. The input circuits of the compare cells C1 through C4 for storing a 1 bit in the corresponding cells are connected to the output of AND gates 301 through 304 respectively. The input circuits of the compare cells C1 through C4 for causing a don't care bit to be stored in the respective compare cells are connected to the output circuits of OR gates 305 through 308, respectively. The compare cells each have three output circuits. Compare cell CA has output circuits referenced by the symbols $CA_B$, $CA_A$ and $\overline{CA}_A$. Compare cell C1 has output circuits referenced by the symbols $C1_B$, $C1_A$ and $\overline{C1}_A$. Compare cells C2, C3 and C4 have similar output circuits.

Refer now to FIG. 3A. As indicated in FIG. 3A, the compare cell C1 provides a control signal at the output circuit $C1_A$ and no control signal at the output circuit $C1_B$ when a 1 bit is stored therein. Also, the compare cell C1 does not form a control signal at either the output circuit $C1_A$ or $C1_B$ when a don't care state is contained therein. The output circuit $\overline{C1}_A$ receives the complement of the signal formed at the $C1_A$ output circuit. For example, if a control signal is formed at the $C1_A$ output circuit, no control signal is formed at the $C1_A$ output circuit and vice versa.

Refer now to the input circuits of the gates for the compare cells. The AND gate 301 has input circuits connected to the output circuits $C1_A$, R1 and C (see FIGS. 1 and 2), and to output circuits of OR gates 310, 311 and 312. The OR gate 310 has input circuits connected to the output circuits $\overline{R2}$ (see FIGS. 1 and 2) and $C1_A$. The OR gate 311 has inputs connected to the output circuits $\overline{R3}$ (see FIGS. 1 and 2) and $C3_A$. The OR gate 312 has inputs connected to the output circuits $\overline{R4}$ (see FIGS. 1 and 2) and $C4_A$.

The AND gate 302 has input circuits connected to the output circuits $\overline{C2}_A$, R2 and C and the output circuits of OR gates 313 and 314. The OR gate 313 has input circuits connected to the output circuits $\overline{R3}$ and $C3_A$. The OR gate 314 has input circuits connected to the output circuits $\overline{R4}$ and $C4_A$.

The AND gate 303 has input circuits connected to the output circuits $\overline{C3}_A$, R3 and C and the output circuit of an OR gate 315. The OR gate 315 has inputs connected to the output circuits $\overline{R4}$ and $C4_A$.

The AND gate 404 has input circuits connected to output circuits R4, $\overline{C4}_A$ and C (see 602 of FIG. 4).

The OR gate 305 has input circuits connected to the output circuits A and F of the sort timing generator 600 (see FIGS. 1 and 4).

The OR gate 306 has input circuits connected to the output circuit A (see FIGS. 1 and 4) and the output circuit of an AND gate 316. The AND gate 316 has input circuits connected to the output circuits F (see FIGS. 1 and 4) and $\overline{C4}_A$.

The OR gate 307 has input circuits connected to the output circuit A and the output circuit of an AND gate 318. The AND gate 318 has input circuits connected to the output circuits F, $\overline{C2}_A$ and $\overline{C1}_A$.

The OR gate 308 has input circuits connected to the output circuit A and the output circuit of an AND gate 320. The AND gate 320 has input circuits connected to the output circuits F, $C3_A$, $\overline{C2}_A$ and $\overline{C1}_A$.

The compare cell CA has input logic 322 for causing a 1 bit to be stored therein in response to a control signal at the A output circuit of the sort timing generator 600. The logic 322 is composed of conventional gating well known in the computer art.

An additional input circuit of each of the compare cells CA, C1 through C4 is connected to the CP output of the master clock 630 shown in FIG. 4. The compare cells are adapted to switch from one state to another when conditioned by the proper gating circuits, as described hereinabove, in response to a clock pulse. Thus, the compare cells are synchronized with the operation of other circuits by clock pulses.

Two amplifiers are connected to the output circuits of each of the compare cells CA and C1 through C4. A separate amplifier is connected to each of the output circuits $CA_B$, $C1_B$ . . . $C4_B$, which amplifiers are referenced by the symbols AAB, A1B . . . A4B. Also a separate amplifier is connected to each of the output circuits $CA_A$, $C1_A$ . . . $C4_A$ which amplifiers are referenced by the symbols AAA, A1A . . . A4A.

Referring again to FIG. 3A, the amplifiers are arranged for forming a control signal at the output circuits thereof having a −2 volt potential whenever no control signal is applied at the input circuit thereof. Whenever a control signal is applied at the input circuit thereof, the amplifiers are arranged for forming a −6 volt potential at the output circuit thereof.

The output circuits of the amplifiers which are designated by the symbols AAB, A1B . . . A4B are connected to the $V_B$ input terminals of the corresponding columns in the memory 9 (see FIGS. 1 and 2). The amplifiers which are referenced by the symbols AAA, A1A through A4A have their output circuits connected to the input terminals $V_A$ of the corresponding columns in the memory 9.

EXAMPLE OF OPERATION

Consider now an example which illustrates the operation of the system of FIG. 1. Assume that the control unit 20 has caused the words 1011, 1010 and 0111 to be written in rows 1, 2 and 3, respectively, of the memory 9 (FIG. 1). Also, assume that the control unit 20 now applies a control signal at the S output circuit thereof indicating that the content of the memory 9 is to be sorted beginning with the largest word and ending with the smallest word in the memory.

FIG. 6 shows the sequence of steps through which the system of FIG. 1 goes while sorting the words 1010, 1011 and 0111 in memory. FIG. 6 shows the phase of the sort timing generator 600, the content of the compare register 300 (including compare cell CA), the signals formed by the readout means 400, the signals on the match detector lines MD1, MD2, and MD3, and the conditions sensed by the M gate 618, the C gate 620 and the RC gate 622. Additionally, the following description is divided into sections headed by the step numbers corresponding to the steps of operation shown in FIG. 6 in order to provide a quick reference between the operation noted in FIG. 6 and the specification. In the following discussion, reference should be made to the sort flow chart of FIG. 5 in order to obtain a better understanding of the sequence of operation of the system of FIG. 1. The upper left hand corner of each block in FIG. 5, except for the readout blocks, has an indication of the phase of operation of generator 602 during which the particular operations noted take place.

*Sequence step 1*

The control signal formed at the S output circuit by the control unit 20 causes the gate 611 (FIG. 4) to set the signal generator 602 into phase A at the occurrence of the next clock pulse from the master clock 630. The control signal at the A output of the signal generator 602 causes the gates 305 through 308 (see FIG. 3) to store a don't care state in the corresponding compare cells; the gate 20 (FIG. 1) to apply a −6 volt signal to the terminals $V_{CL}$ of the mark cells 200 in column A causing a 1 bit to be stored in each of the mark cells; and the logic 322 (see FIG. 3) to store a 1 bit in the compare cell CA. At this point, all compare cells in the compare register except for CA contain a don't care state except for compare cell CA which contains a 1 bit. Since all memory cells in column A contain a 1 bit, the contents of all rows in the memory 9 match the content of the compare register means 300. As a result, each of the word match detectors WMD1 through WMD3 form a true signal at the corresponding output circuits MD1, MD2 and MD3. Since the content of more than one of the rows of the memory 9 matches the content of the compare register means 300, the M gate 618 (see FIG. 4) forms a control signal at the $M>1$ output circuit. Also, since there are no 1 bits contained in compare cells C1 through C4, the C gate 620 (see FIG. 4) forms a control signal at the $C=0$ output circuit.

Also, the control unit 20 continuously applies a control signal at the output circuit R during a sort operation. Therefore, read amplifiers RA1, RA2 and RA3 apply a read signal to the corresponding rows in the memory 9 causing the contents of the rows to be read out and applied as control signals to the readout means 400. Thus, the output signals from the readout means 400 indicate that 1 bits are being read out of at least one memory cell in each column of memory. This causes the RC gate 622 to form a control signal at the output circuit RC indicating that there is at least one compare cell containing a don't care state which has a 1 bit stored in the corresponding column of the memory 9 (indicated by signals from the unprimed output circuits of the readout means 400). As indicated in FIG. 5, when control signals are formed at the $M>1$ and RC output circuits, a 1 bit must be stored in the highest order compare cell storing a don't care bit which has a 1 bit in at least one memory cell in the corresponding column of the memory.

In order to accomplish this action, the signal generator must be set into phase C. To this end, the gate 613 (FIG. 4) receives control signals which enable it to trigger the signal generator into phase C at the following clock pulse.

*Sequence step 2*

Since the signal generator is in phase C and the AND gate 304 (FIG. 3) receives control signals from the output circuits R4 (see FIGS. 1 and 2) and $\overline{C4}_A$ indicating that compare cell C4 is the highest order compare cell storing a don't care state which has a 1 bit in at least one cell in the corresponding column of the memory, the AND gate 304 stores a 1 bit in the compare cell C4.

At this point the compare register 300 contains a 1 bit in compare cells C4 and CA and don't care states in compare cells C1, C2 and C3. Comparing the content of the compare register 300 with the words being sorted which are shown at the bottom of FIG. 6, only the content of rows 1 and 2 match the content of the compare register 300, the reason being that the 1 bit in compare cell C4 does not match the 0 bit contained in the cell in row 3, column 4. Therefore, true signals are formed at the output circuits MD1 and MD2 and a false signal is formed at the MD3 output circuit of word match detector MD3. Since the content of more than one row match the content of the compare register means 300, a control signal is formed at the $M>1$ output circuit (see M gate 618, FIG. 4). However, there is at least one 1 bit contained in the compare register means 300 causing C gate 620 to form a control signal at the $C=1$ output circuit. Since the content of rows 1 and 2 of the memory match the content of the compare register means 300, gates 16 and read amplifiers RA1 and RA2 of rows 1 and 2 cause the contents of rows 1 and 2 to be read out and signals corresponding thereto applied to the readout means 400. Since there is a 1 bit read out of columns 1, 2 and 4, the readout means 300 forms control signals at output circuits R1, R2 and R4 so indicating. There is at least one don't care bit in the compare register with a corresponding 1 bit in the memory (which is being read out); therefore in addition to the control signal at the output circuit $M>1$, a control signal is formed at the RC output circuit (see RC gate 622, FIG. 4). Under these conditions, another 1 bit must be stored in the highest order compare cell which is storing a don't care bit and which has a 1 bit in at least one memory cell of the corresponding column of memory. Since row 3 mismatches and both rows 1 and 2 contain a 0 in column 3, column 2 has the next highest order cell containing a 1 bit. Therefore, a 1 bit must be stored in compare cell C2. To this end the sequence count 3 is entered and the signal generator 602 remains in phase C.

*Sequence step 3*

During sequence step 3, the gates 302, 313 and 314 are responsive to control signals at the $\overline{R3}$, $C4_A$, R2 and $\overline{C2}_A$ output circuits for causing a 1 bit to be stored in compare cell C2 at the occurrence of the clock pulse.

At this point, the compare register 300 contains a 1 bit in compare cells C4, C2 and CA and don't care bits in compare cells C3 and C1. Again, there is more than one row in the memory cell, the contents of which matches the content of the compare register means 300 causing a signal at the $M>1$ output circuit. Also, the gate 16 of rows 1 and 2 and the read amplifiers 12 of rows 1 and 2 cause a read signal to be applied to each of the cells in rows 1 and 2. The read signal applied to rows 1 and 2 cause a 1 bit to be sensed by the readout means in columns 1, 2 and 4 and a control signal is formed at the RC output circuit. Since the conditions sensed by the M gate, C gate and RC gate are the same as for sequence step 2, a 1 bit must again be stored in the highest order compare cell storing a don't care state which has a 1 bit in at least one cell of the corresponding column of memory. To this end, sequence count 4 is entered and the signal generator 602 remains in phase C.

*Sequence step 4*

During sequence step 4, the gates 301, 310, 311 and 312 are responsive to control signals at the $C2_A$, $\overline{R3}$, $C4_A$, R1 and $\overline{C1}_A$ output circuits for causing a 1 bit to be stored in compare cell C1.

The compare register means 300 now contains a 1 bit in each compare cell except compare cell C3 which contains a don't care state. As a result, the content of row 2 matches the content of the compare register means 300 and the only word match detector line which receives a true signal is MD2. This causes the word in row 2 to be read out. As a result, the word 1011 is read out of the memory 9 and corresponding readout signals are formed by the readout means 400. Also, the M gate 618 (FIG. 4) forms a control signal at the $M=1$ output circuit, and the C gate 620 still forms a control signal at the $C=1$ output circuit. Additionally, there are no compare cells containing a don't care bit with a 1 bit in a corresponding row of the memory, and the RC gate (FIG. 2) forms a control signal at the $\overline{RC}$ output circuit.

The aforementioned conditions during step 3 cause the gate 614 (FIG. 4) to apply a control signal to the signal generator 602 causing it to be set into phase D.

*Sequence step 5*

During sequence step 5, a control signal is formed at the D output circuit in the signal generator 602 causing a 0 bit to be stored in the mark cell at row 2, column A. In this manner, the word stored in row 2 is marked as having been isolated and a permanent mismatch is caused between the content of row 2 and the interrogation word in the compare register means 300.

At this point, none of the words in the memory 9 match the content of compare register means 300 since a 0 bit is stored in the mark cell 200 of row 2 and the content of the compare register means 300 does not match the content of either row 1 or 3. As a result, none of the word match detector lines MD1, MD2 or MD3 receive a true signal and the M gate 618 (FIG. 4) forms a control signal at the $M=0$ output circuit. Also the C gate 620 (FIG. 4) detects that there is at least one 1 bit contained in the compare cells C1 through C4 and a control signal is formed at the $C=1$ output circuit.

The gate 616 (FIG. 4) senses the control signals at output circuits $M=0$ and $C=1$ and applies a control signal to the input of the signal generator 602 causing it to be set into phase F at the next clock pulse.

*Sequence step 6*

With reference to FIG. 5, it will be noted that with the signal generator in phase F and control signals formed at $M=0$ and $C=1$, a don't care state is to be stored in the lowest order compare cell containing a 1 bit. To this end, the gate 305 is responsive to the control signal formed at the F output circuit for causing a don't care state to be stored in compare cell C1.

The compare register means 300 now contains the word $1\phi1\phi1$. Therefore, the content of word 1 matches the content of the compare register means 300 causing a true signal to be formed at the MD1 output circuit of the word match detector WMD1. The true signal at MD1 causes the content of row 1 to be read out of the memory 9. As a result, the memory means 400 detects the word 1010 (the content of row 1).

Also the M gate 618 (FIG. 4) again detects that only a single word in the memory matches the content of the compare register means 300 and a control signal is formed at the $M=1$ output circuit. This causes a control signal to again be applied by the gate 614 (FIG. 4) to the signal generator 602 causing it to again be set into phase D.

*Sequence step 7*

The control signal formed at the output circuit D by the signal generator 602 again causes a control signal to be applied by the gate 18 (FIG. 1) to each of the mark cells 200 in column A in coincidence with the read signal formed by the read amplifier RA1 and a 0 bit is stored into the mark cell 200 of row 1. Since the mark cell 200 now contains a 0 bit, a mismatch is again caused between the matching word and the content of the compare register means 300.

The operation during sequence steps 8, 9 and 10 are quite similar to the steps 5, 6 and 7 already described, and the steps may be understood with reference to the example shown in FIG. 6 making reference to the discussion of the previous steps.

At the end of sequence step 10, each compare cell in the compare register means 300 contains a don't care state and the content of none of the rows in the memory match the content of the compare register means 300. As a result, a control signal is formed at the $M=0$ and $C=0$ output circuits (FIG. 4). With reference to FIG. 5, it will be noted that these signal conditions indicate that the sorting operation is complete. Referring to FIG. 4, the gate 615 is responsive to the signal conditions for causing the signal generator 602 to be set into phase E where the sorting operation terminates. The signal generator 602 remains in phase E until another sorting command is indicated by a control signal at the S output circuit of the control unit 20 (see FIG. 1).

A few important possible variations in the system described should be noted. The number of bits of storage in each row could be increased with the additional bits containing information associated with the first four bits. In this situation, the number of bits used for sorting would be limited to the desired bits. With such an arrangement, it may be desired to read out part or all of the enlarged row upon isolation of the row in accordance with the above outlined rules.

It should also be understood that the number of rows of cells may be increased and the operation would be essentially the same. Four rows are shown and described herein merely by way of example.

Additionally, it may not be desired to read out the content of the isolated row nor to even read out the content of the memory cells during the sorting operation. The elimination of reading capabilities would eliminate a considerable part of the circuitry associated with reading shown in the system. Instead of reading out the content of an isolated row, it may be desired merely to determine the order of the rows in which the words of information are stored.

It should also be noted that other associative cells could be used for sorting within the scope of the present invention. For example, the memory cells could be used which are shown and described in the copending patent application entitled "Memory System" bearing the Ser. No. 236,310 filed on Nov. 8, 1962, in the name of Edwin S. Lee III. With the associative cells described in the patent application "Memory System," the steps of sorting would be quite similar to those described herein except that an extra phase of operation is needed for comparing.

The fact that the associative cells disclosed herein have the ability to compare while reading is of considerable importance as it saves times by allowing the reading and comparing operations to overlap in time.

What is claimed is:

1. A sorting apparatus comprising:

(a) a compare register comprising a plurality of compare cells arranged in order between a highest order and a lowest order compare cell, each of the compare cells being adapted for storing either a first signal representing a binary coded one bit or a second signal, a said second signal being representative of either a binary coded one or zero bit;

(b) a memory device comprising a plurality of memory cells arranged in rows and columns including one column for each of said compare cells, one of said columns of memory cells being a column of marker memory cells, the memory cells being adapted for storing either a binary coded one bit or zero bit and characterized as capable of forming compare signals indicative of either a match or a mismatch between the storage content thereof and the storage content of the corresponding compare cell when the corresponding compare cell stores a first signal and capable of always forming a signal indicative of a match when the corresponding compare cell stores a second signal;

(c) means responsive to compare signals indicating the match of more than one complete row for causing the storage of a first signal in the highest order compare cell which contains a second signal and has a one bit stored in the corresponding column of the memory device;

(d) means responsive to compare signals indicating the absence of a match of a complete row for causing the storage of a second signal in the lowest order compare cell which contains a first signal if there is at least one first signal in the compare register and thereby cause the content of the compare register to sequentially match and isolate the content of the rows in the memory device; and (e) means responsive to the compare signals for selectively causing the storage of a bit in the marker cell of the row, the content of which is isolated from the content of the other rows by the matching content of the compare register, the bit stored in the marker cell being such that a mismatch is caused between the content of the corresponding row and the content of the compare register to thereby prevent the same word from being isolated a second time.

2. A sorting apparatus comprising:

(a) a compare register comprising a plurality of compare cells arranged in order between a highest order and a lowest order compare cell, each of the compare cells being adapted for storing either a first signal representing a binary coded one bit or a second signal, a said second signal being representative of either a binary coded one or zero bit;

(b) a memory device comprising a plurality of memory cells arranged in rows and columns including one column for each of said compare cells, one of said columns of memory cells being a column of marker memory cells, the memory cells being adapted for storing either a binary coded one bit or zero bit and characterized as capable of forming readout signals and compare signals indicative of either a match or a mismatch between the storage content thereof and the storage content of the corresponding compare cell when the corresponding compare cell stores a first signal and capable of always forming a signal indicative of a match when the corresponding compare cell stores a second signal;

(c) means responsive to compare signals indicating the match of more than one complete row for causing the storage of a first signal in the highest order compare cell which contains a second signal and has a one bit stored in the corresponding column of the memory device;

(d) means responsive to compare signals indicating the absence of a match of a complete row for causing the storage of a second signal in the lowest order compare cell which contains a first signal if there is at least one first signal in the compare register and thereby cause the content of the compare register to sequentially match and isolate the content of the rows in the memory device;

(e) means responsive to the compare signals for selectively causing the storage of a bit in the marker cell of the row, the content of which is isolated from the content of the other rows by the content of the compare register, the bit stored in the marker cell being such that a mismatch is caused between the content of the corresponding row and the content of the compare register to thereby prevent the same word from being isolated a second time; and (f) means for providing a readout signal to the cells in the isolated row of the memory device for causing the content thereof to be read out.

3. A sorting apparatus comprising:

(a) a compare register comprising a plurality of compare cells arranged in order between a highest order and a lowest order compare cell, each of the compare cells being adapted for storing either a first signal representing a binary coded one bit or a second signal, a said second signal being representative of either a binary coded one or zero bit;

(b) a memory device comprising a plurality of memory cells arranged in rows and columns including one column for each of said compare cells, one of said columns of memory cells being a column of marker memory cells, the memory cells being adapted for storing either a binary coded one bit or zero bit and characterized as capable of forming compare signals indicative of either a match or mismatch between the storage content thereof and the storage content of the corresponding compare cell when the corresponding compare cell stores a first signal and capable of always forming a signal indicative of a match when the corresponding compare cell stores a second signal;

(c) means responsive to said compare signals and the storage content of said memory cells and compare register for altering the bit content of the compare register in a predetermined sequence defined by the content of the memory rows to cause a sequence of matching conditions to occur between the content of the compare register and the memory rows which isolates the contents of the memory rows in the order to be stored; and (d) means responsive to the compare signals for selectively causing the storage of a bit in the marker cell of the row, the content of which is isolated from the content of the other rows by the matching content of the compare register, the bit stored in the marker cell being such that a mismatch is caused between the content of the corresponding row and the content of the compare register to thereby prevent the same word from being isolated a second time.

4. A sorting apparatus as defined in claim 3 wherein said compare cell includes at least two separate output circuits for receiving signals indicative of the storage content of the compare cell and wherein said memory cells comprise first and second switching devices having input, output and control circuits, the input circuits being connected to a source of reference potential and the output-control circuits being individually and symmetrically connected through impedance means to separate output circuits of the corresponding compare cells and being regeneratively cross coupled to cause switching devices to alternately conduct for defining two stable states, and means coupled to the individual output circuits of the switching devices and adapted for forming compare signals indicative of a match between the storage content of the corresponding cell and the storage content of the corresponding compare cell.

5. A sorting apparatus comprising:

(a) a plurality of bistable memory cells arranged in rows and columns including a column of marker memory cells, the memory cells being characterized as capable of storing a binary coded bit of information of forming readout signals and of forming compare signals indicative of either a match or a mismatch as a result of a comparison between the storage content thereof and an applied first signal but forming a signal indicative of a match regardless of the content thereof in response to an applied second signal;

(b) a compare cell for each column of cells adapted for applying such first and second signals to each column of cells indicative of the storage content of the compare cell for causing compare signals to be formed by the memory cells in the corresponding column;

(c) means for each row of cells for selectively applying a read control signal to the cells in the corresponding row for causing the storage content thereof to be read out;

(d) means responsive to the compare signals and the readout signals from the memory cells and the storage content of the compare cells and including means responsive to the sensed conditions individually and in combination for causing the storage content of the compare cells to be changed in a predetermined sequence defined by the sensed conditions for causing matches between the contents of the rows of the memory cells and the compare cells to take place in a sequence defining the order with which the contents of the rows of memory cells are sorted; and (e) means responsive to said compare signals for selectively causing the storage of a marker signal in the marker memory cell corresponding to a row of memory cells which is sensed to contain information matching the content of the compare cells and thereby cause a mismatch between the compare cells and the matching rows of memory cells to prevent the same row from being matched again by the compare cells.

6. A sorting apparatus comprising:

(a) compare register means comprising a plurality of compare cells arranged in order between a highest order and a lowest order compare cell, each of the compare cells being adapted for storing either a first signal representing a first binary coded bit or a second signal, said second signal being representative of either such first binary coded bit or a second binary coded bit;

(b) memory means comprising a plurality of memory cells arranged in rows and columns including one column coupled to each of said compare cells, one of said columns of memory cells being a column of marker memory cells, the memory cells being adapted for storing either said first or said second binary coded bits and characterized as capable of forming compare signals indicative of either a match or a mismatch between the storage content thereof and the storage content of the corresponding compare cell when the corresponding compare cell stores such first signal and capable of always forming a signal indicative of a match when the corresponding compare cell stores such second signal;

(c) means responsive to such compare signals indicating the match of more than one complete row for causing the storage of said first signal in the highest order compare cell which contains such second signal and has a first bit stored in the corresponding column of the memory means;

(d) means responsive to such compare signals indicating the absence of a match of any row for causing the storage of such second signal in the lowest order compare cell which contains a first signal if there is at least one of such first bits in the compare register and thereby cause the content of the compare register to sequentially match and isolate the content of the rows in the memory means; and (e) means responsive to the compare signals for selectively causing the storage of a bit in the marker cell of the row, the content of which is isolated from the content of the other rows by the matching content of the compare register means, the bit stored in the marker cell being such that a mismatch is caused between the content of the corresponding row and the content of the compare register means to thereby prevent the same word from being isolated a second time.

7. A sorting apparatus comprising:

(a) compare register means comprising a plurality of compare cells arranged in order between a highest order and a lowest order compare cell, each of the compare cells being adapted for storing either a first signal representing a first binary coded bit or a second signal, said second signal being representative of either such first binary coded bit or a second binary coded bit;

(b) memory means comprising a plurality of memory cells arranged in rows and columns including one column coupled to each of said compare cells, one of said columns of memory cells being a column of marker memory cells, the memory cells being adapted for storing either said first or said second binary coded bits and characterized as capable of forming compare signals indicative of either a match or a mismatch between the storage content thereof and the storage content of the corresponding compare cell when the corresponding compare cell stores such first signal and capable of always forming a signal indicative of a match when the corresponding compare cell stores such second signal, said memory means comprising means for combining the compare signals for each row of cells to thereby provide an individual signal indicative of a match or a mismatch for each complete row;

(c) means responsive to such compare signals indicating the match of more than one complete row for causing the storage of said first signal in the highest order compare cell which contains a second signal and has a first bit stored in the corresponding column of the memory means;

(d) means responsive to such compare signals indicating the absence of a match of any row for causing the storage of such second signal in the lowest order compare cell which contains such first signal if there is at least one of such first bits in the compare register and thereby cause the content of the compare register to sequentially match and isolate the content of the rows in the memory means; and (e) means responsive to the compare signals for selectively causing the storage of a bit in the marker cell of the row, the content of which is isolated from the content of the other rows by the matching content of the compare register means, the bit stored in the marker cell being such that a mismatch is caused between the content of the corresponding row and the content of the compare register means to thereby prevent the same word from being isolated a second time.

8. A sorting apparatus comprising:

(a) compare register means comprising a plurality of compare cells arranged in order between a highest order and a lowest order compare cell, each of the compare cells being adapted for storing either a first signal representing a first binary coded bit or a second signal, said second signal being representative of either such first binary coded bit or a second binary coded bit;

(b) memory means comprising a plurality of memory cells arranged in rows and columns including one column coupled to each of said compare cells, one of said columns of memory cells being a column of marker memory cells, the memory cells being adapted for storing either said first or said second binary coded bits, each of said cells including means for forming compare signals indicative of either a match or a mismatch between the storage content thereof and the storage content of the corresponding compare cell when the corresponding compare cell stores such first signal and capable of always forming a signal indicative of a match when the corresponding compare cell stores such second signal, said memory means comprising means for combining the compare signals for each row of cells to thereby provide an individual signal indicative of a match or a mismatch for each complete row;

(c) means responsive to such compare signals indicating the match of more than one complete row for causing the storage of said first signal in the highest order compare cell which contains a second signal and has a first bit stored in the corresponding column of the memory means;

(d) means responsive to such compare signals indicating the absence of a match of any row for causing the storage of such second signal in the lowest order compare cell which contains such first signal if there is at least one of such first bits in the compare register and thereby cause the content of the compare register to sequentially match and isolate the content of the rows in the memory means; and (e) means responsive to the compare signals for selectively causing the storage of a bit in the marker cell of the row, the content of which is isolated from the content of the other rows by the matching content of the compare register means, the bit stored in the marker cell being such that a mismatch is caused between the content of the corresponding row and the content of the compare register means to thereby prevent the same word from being isolated a second time.

9. A sorting apparatus comprising:

(a) compare register means comprising a plurality of compare cells arranged in order between a highest order and a lowest order compare cell, each of the compare cells being adapted for storing either a first signal representing a first binary coded bit or a second signal, said second signal being representative of either such first binary coded bit or a second binary coded bit;

(b) memory means comprising a plurality of memory cells arranged in rows and columns including one column coupled to each of said compare cells, one of said columns of memory cells being a column of marker memory cells, the memory cells being adapted for storing either said first or said second binary coded bits, each of said cells including means for forming compare signals indicative of either a match or a mismatch between the storage content thereof and the storage content of the corresponding compare cell when the corresponding compare cell stores such first signal and capable of always forming a signal indicative of a match when the corresponding compare cell stores such second signal;

(c) means responsive to such compare signals indicating the match of more than one complete row for causing the storage of said first signal in the highest order compare cell which contains a second signal and has a first bit stored in the corresponding column of the memory means;

(d) means responsive to such compare signals indicating the absence of a match of any row for causing the storage of such second signal in the lowest order compare cell which contains such first signal if there is at least one of such first bits in the compare register and thereby cause the content of the compare register to sequentially match and isolate the content of the rows in the memory means; and (e) means responsive to the compare signals for selectively causing the storage of a bit in the marker cell of the row, the content of which is isolated from the content of the other rows by the matching content of the compare register means, the bit stored in he marker cell being such that a mismatch is caused between the content of the corresponding row and the content of the compare register means to thereby prevent the same word from being isolated a second time.

References Cited

UNITED STATES PATENTS

| | | | |
|---|---|---|---|
| 3,031,650 | 4/1962 | Koerner | 340—174 |
| 3,121,217 | 4/1964 | Seeber et al. | 340—174 |
| 3,253,264 | 5/1966 | Seeber et al. | 340—172.5 |
| 3,264,624 | 8/1966 | Weinstein | 340—172.5 |

ROBERT C. BAILEY, *Primary Examiner.*

R. M. RICKERT, *Assistant Examiner.*

UNITED STATES PATENT OFFICE

CERTIFICATE OF CORRECTION

Patent No. 3,328,769 June 27, 1967

Edwin S. Lee III

It is hereby certified that error appears in the above numbered patent requiring correction and that the said Letters Patent should read as corrected below.

Column 2, line 45 and column 20, line 68, for "stored", each occurrence, read -- sorted --; column 7, line 11, for "each" read -- each of --; column 10, line 22, for "he" read -- the --; line 70, for "based" read -- biased --.

Signed and sealed this 18th day of June 1968.

(SEAL)
Attest:

Edward M. Fletcher, Jr.
Attesting Officer

EDWARD J. BRENNER
Commissioner of Patents